(12) United States Patent
Harmon et al.

(10) Patent No.: US 7,904,128 B2
(45) Date of Patent: Mar. 8, 2011

(54) RETRACTABLE LANYARD ATTACHMENT POSTS AND PUSH-PUSH DEVICES

(75) Inventors: Roger W Harmon, Crystal Lake, IL (US); Christopher A. Arnholt, Highland Park, IL (US); Jason E Jordan, Palatine, IL (US); Tim J Sutherland, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 599 days.

(21) Appl. No.: 11/949,136

(22) Filed: Dec. 3, 2007

(65) Prior Publication Data

US 2009/0143116 A1 Jun. 4, 2009

(51) Int. Cl.
*H04M 1/00* (2006.01)

(52) U.S. Cl. .................. 455/575.6; 455/575.1; 455/90.3; 455/575.7

(58) Field of Classification Search ............... 455/575.6, 455/575.1, 575.5, 575.7, 90.3, 550.1; 200/528, 200/527
See application file for complete search history.

(56) References Cited

U.S. PATENT DOCUMENTS

| | | | |
|---|---|---|---|
| 5,178,265 A * | 1/1993 | Sepke | 200/528 |
| 5,507,423 A | 4/1996 | Fischer et al. | |
| 5,630,632 A | 5/1997 | Swan | |
| 5,657,969 A * | 8/1997 | Bivens | 267/64.12 |
| 6,094,566 A | 7/2000 | Dasent et al. | |
| 7,198,498 B2 | 4/2007 | Miyamoto | |
| 7,261,327 B1 * | 8/2007 | Johnston | 289/17 |
| 2004/0052364 A1 | 3/2004 | Bodley et al. | |
| 2005/0096103 A1 | 5/2005 | Eaton et al. | |

FOREIGN PATENT DOCUMENTS

| | | |
|---|---|---|
| GB | 2355759 A | 5/2001 |
| GB | 2394251 A | 4/2004 |
| WO | 03045187 A1 | 6/2003 |

* cited by examiner

*Primary Examiner* — John Lee
(74) *Attorney, Agent, or Firm* — Gary J. Cunningham (57) ABSTRACT

Described are mobile communication devices with retractable lanyard attachment posts that can be hidden when not in use. Also disclosed are embodiments of lanyard attachment posts that may include push-push or other mechanisms that a user may engage to deploy or hide the attachment post. In this way, by being able to hide the lanyard attachment member, the sleek lines of modern mobile communication devices may be maintained. Several embodiments include a push-push mechanism, for example, an E-clip embodiment, a C-clip embodiment, a stacked internal mechanism embodiment, and a compliant arm mechanism embodiment. Also disclosed is an embodiment of a retractable lanyard attachment post that may be respectively retained or released by turning the attachment post. In this manner, with either a push-push embodiment or a turnable embodiment, the mechanism for concealment and deployment of the lanyard attachment post may better utilize the device volume.

20 Claims, 9 Drawing Sheets

RETRACTABLE LANYARD ATTACHMENT POSTS AND PUSH-PUSH DEVICES

FIELD

Disclosed are devices for attaching a lanyard to a portable electronic device, and more particularly devices for deployment and concealment of a lanyard attachment site of an electronic device.

BACKGROUND

Mobile communication devices, such as, for example, cellular telephones, are widely used in today's world, providing a variety of communication possibilities, for example, by voice, by email, and by text messaging. The devices are popular because they provide many functions such as organizers and calendars, phone books, message repositories, and an array of media capabilities, including music and other media player capability, as well as cameras for built-in video and/or still image capture.

In addition to being a versatile electronic communication tool, a mobile communication device can be a fashion accessory, with consumers oftentimes preferring sleek, modern designs. A consumer may choose one mobile communication device over another based on the style or appearance of the chosen device. Accordingly, a mobile communication device can make a fashion statement for the user.

Some users prefer to carry a mobile communication device on a lanyard, that is, a rope or cord intended to carry the device and to be worn on a user's wrist or around the user's neck. Accordingly, lanyard attachment members are typically incorporated in devices. A lanyard attachment post may extend from an end or side of the mobile communication device. Aside from the possibility of its catching on clothing, books, or other objects, a lanyard attachment post that permanently extends from a mobile communication device may break up the sleek appearance of modern designs unless the lanyard post is actually in use.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

It would be beneficial to have devices by which a user of a mobile communication device having a lanyard attachment post could hide the attachment post when it was not in use, so that the attachment post would not detract from the sleek look of the device. It would further be beneficial if the mechanism for concealment and deployment of the lanyard attachment post was small, to better utilize the device volume. It would in addition be beneficial if a user could easily deploy the lanyard attachment post for use and easily stow the attachment post when not in use.

Described below are mobile communication devices with retractable lanyard attachment posts that can be hidden when not in use. Disclosed is an embodiment of a retractable lanyard attachment post that may be respectively retained or released by turning the attachment post. Also disclosed are embodiments of hidden lanyard attachment posts that may include push-push mechanisms that a user may engage to deploy or hide the attachment post. In this way, by being able to hide the lanyard attachment member, the sleek lines of modern mobile communication devices may be maintained. Several embodiments include a push-push mechanism, for example, an E-clip embodiment, a C-clip embodiment, a stacked internal mechanism embodiment, and a compliant arm mechanism embodiment. In this manner, with either a turnable embodiment or a push-push embodiment, the mechanism for concealment and deployment of the lanyard attachment post may better utilize the device volume.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

Figure 1:
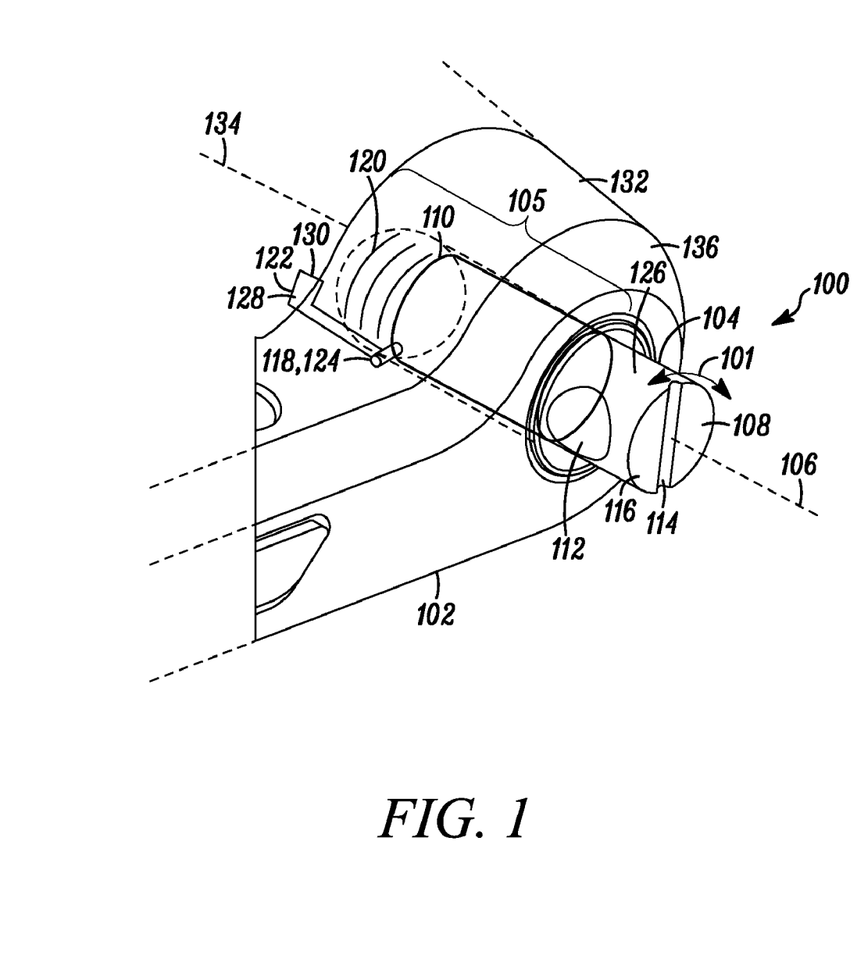
FIG. 1 shows a turnable embodiment of a retractable lanyard attachment post that can be hidden when not in use, the drawing also showing a portion of a portable electronic device.

FIG. 1 shows a turnable embodiment of a retractable lanyard attachment post 100 that can be hidden when not in use, the drawing also showing a portion of a portable electronic device 102. The retractable lanyard attachment post 100 may be respectively retained or released by turning the attachment post, as described in detail below. In this manner, a user may easily deploy the lanyard attachment post 100 for use and easily hide or stow the attachment post when not in use and thus not detract from the otherwise sleek appearance of a modern design communication device.

In the depicted embodiment, the portable electronic device 102 is a mobile communication device. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multimedia content access and/or voice over Internet protocol (VoIP).

As discussed above, the described lanyard attachment post 100 is retractable so it may be hidden. The retractable lanyard attachment post 100 includes a cylindrical shaft 104 configured to be slidably received by a recess 105 of the portable electronic device 102. The cylindrical shaft 104 defines an axis 106 and has a first end 108 and a second end 110. Moreover, the cylindrical shaft 104 is configured to have a first orientation and a second orientation 101 about the axis 106 of the cylindrical shaft. In addition, the cylindrical shaft 104 further defines an aperture 112 configured to receive a lanyard and proximal the first end 108. A user may hide or stow the retractable lanyard attachment post 100 by pushing the attachment post into a recessed position and engaging a retention structure by rotating the cylindrical shaft 104 as explained below. In this way the lanyard attachment post may be hidden.

Also discussed above, a user may easily deploy the lanyard attachment post 100 for use and easily hide or stow the attachment post when not in use. The cylindrical shaft 104 defines a transverse slot 114 to ease deployment and stowing of the attachment post 100. The transverse slot 114 is perpendicular to the axis 106, and traverses a surface 116 of the first end 108.

The slot 114 may be used to rotate the cylindrical shaft 104 about the axis 106 from the first orientation to the second orientation and vice versa 101. It is understood that a protrusion, knurl, or any other manner in which to grip the end of the cylindrical shaft 104 for rotating the shaft from one orientation to the other orientation 101 is within the scope of this discussion. It is further understood that the cylindrical shaft 104 may be circular in cross section to facilitate its rotation about the axis 106 within the recess 105. By rotating the cylindrical shaft 104, as mentioned above, a user may deploy or hide the lanyard attachment post 100.

The cylindrical shaft 104 in addition defines a retention member 118 proximal the second end 110. The retention member 118 is configured in the first orientation to engage a retention structure 122 in the recess 105 of the portable electronic device 102 so as to keep the cylindrical shaft 104 in a recessed position within the portable electronic device 102. The retention member 118 is configured in the second orientation to disengage the retention structure 122 in the recess 105, so that the cylindrical shaft 104 may move in an axial direction, as defined by the axis 106. In this manner, the cylindrical shaft 104 may effect stowing and deployment of the lanyard attachment post 100.

So that the retractable lanyard attachment post 100 may be easily deployed, the lanyard attachment post also includes a spring 120. The spring 120 is coupled to the cylindrical shaft 104 proximal the second end 110 of the cylindrical shaft, and configured to be compressed by the cylindrical shaft. Moreover, the spring 120, when compressed, may exert a force against the cylindrical shaft 104, tending to urge the shaft into a deployed position. In this manner, the cylindrical shaft 104 is configured in the second orientation to be pushed by the spring 120 partially out of the portable electronic device 102 so that the aperture 112 is available for receiving a lanyard.

As discussed above, by concealing the lanyard attachment post 100, the sleek appearance of a modern design may be maintained. A user may hide or stow the retractable lanyard attachment post 100 by pushing the attachment post into a recessed position and engaging the retention structure 122 as explained below. Accordingly, the cylindrical shaft 104 is configured to be pushed into a recessed position within the portable electronic device 102. Furthermore, the transverse slot 114 is configured so that, when the cylindrical shaft 104 is pushed into the recessed position, the transverse slot 114 enables rotation of the cylindrical shaft 104 from the second orientation to the first orientation so that the retention member 118 engages the retention structure 122. In this way, the lanyard attachment post 100 may be retained in the recessed position and thus hidden within the device 102, thereby preserving the design lines and styling of the device 102 when the attachment post 100 is not in use.

The retention member 118 may include a pin 124 disposed perpendicular to a cylindrical surface 126 of the cylindrical shaft 104 and proximal the second end 110 of the cylindrical shaft 104. It is understood that the retention member 118 may include any number of pins for example symmetrically disposed about the cylindrical surface 126 of the cylindrical shaft 104. In addition, the retention structure 122 may include one or more corresponding slots 128 configured to correspond to the pin or pins 124 of the retention member 118. The slot or slots 128 may include for example, a perpendicular portion 130 to prevent the retention member 118 from being removed unless the cylindrical shaft 104 is moved to the second orientation. In this manner the retention member 118 may be configured so that the spring 120 may exert a compression force, and thus may maintain a clamping force between the pin 124 and the perpendicular portion 130. The lanyard attachment post 100 is therefore hidden when not in use.

As shown in FIG. 1, the portable electronic device 102 may include a hinge 132 having a hinge axis 134. In an embodiment, the axis 106 of the cylindrical shaft 104 may be aligned proximal the hinge axis 134. In the same embodiment or another embodiment, the hinge 132 of the portable electronic device 102 may include a hinge knuckle 136 that defines the recess 105. In this manner, a mechanism for concealment and deployment of the lanyard attachment post 100 may better utilize the device 102 volume.

Figure 2:
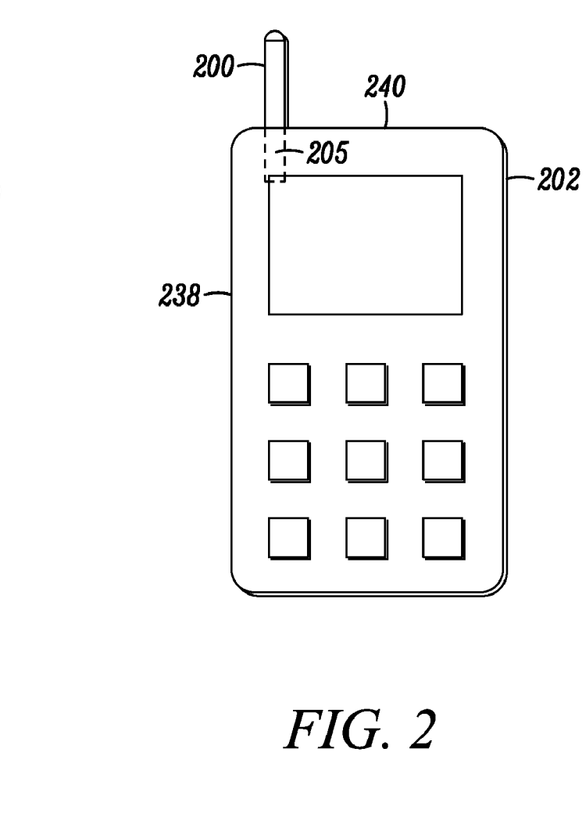
FIG. 2 shows an embodiment of a portable electronic device that includes a retractable lanyard attachment post.

FIG. 2 shows an embodiment of an electronic device and in particular, of a portable electronic device 202 that includes the described retractable lanyard attachment post 200. The device 202 includes a device housing 238 having an end 240. The device housing 238 defines a recess 205 proximal the end 240. The lanyard attachment post 200 may be concealed within and/or deployed from the recess 205 via the mechanism described in connection with FIG. 1, or via another mechanism for concealment and deployment of a retractable lanyard attachment post 200, such as a push-push mechanism as described in detail below.

In a push-push mechanism, for example a user may first push a retractable lanyard attachment post (300, see FIG. 3 below) from a deployed position to a recessed position, where the mechanism latches the attachment post into the recessed position. A second push while the attachment post is in the recessed position restores the mechanism to an unlatched state, in which a coiled or other type of spring pushes the attachment post back into the deployed position. With two pushes, the device operates as a push-push mechanism.

Embodiments of a several different types of push-push mechanisms are discussed within this disclosure. Accordingly, in this disclosure, the push-push mechanism of FIG. 3 (and FIGS. 4 and 5 below) may be referred to as a first type of push-push mechanism. Other types of push-push mechanisms are discussed below in connection with FIGS. 6 through 20. A second type of push-push mechanism, for example, is discussed in connection with the embodiment of FIGS. 6 through 8. A third type of push-push mechanism is discussed below in connection with the embodiment of FIGS. 9 through 11. A fourth type of push-push mechanism is discussed with reference to FIG. 12. A fifth type of push-push mechanism is discussed with reference to FIGS. 13 through 20. It is understood that the embodiments illustrated are not all inclusive of the described devices.

Figure 3:
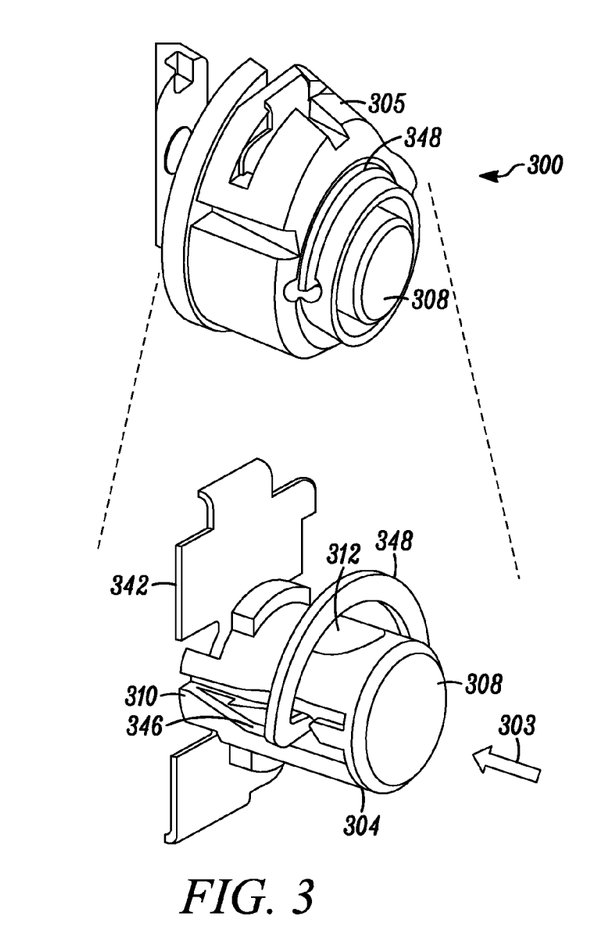
FIG. 3 shows a right front three quarter view of a retractable lanyard attachment post that operates according to a first type of push-push mechanism.

FIG. 3 shows a right front three quarter view of a retractable lanyard attachment post 300 that operates according to a first type of push-push mechanism. The lanyard attachment post 300 includes a number of parts that cooperate to accomplish the operation of the first type of push-push mechanism. The parts of the lanyard attachment post, and their cooperation, are discussed below.

In the first type of push-push mechanism, the lanyard attachment post 300 includes a cylindrical housing 305 within which may slide a cylindrical lanyard shaft 304 in and out of the cylindrical housing for stowing and deployment. The cylindrical housing 305 may for example be a part of, or proximal, a hinge knuckle of an electronic device 102 (see FIG. 1) that includes a hinge 132. In another embodiment, an electronic device 202 (see FIG. 2) may include a device housing 238 that has an end 240, with the cylindrical housing 305 disposed proximal the end 240 of the device housing 238.

FIG. 3 includes a view of the retractable lanyard attachment post 300 without the cylindrical housing 305 for ease of viewing with respect to this disclosure. A user may alternately deploy and hide the retractable lanyard attachment post 300 by a push 303 of a finger or other object on a first end 308 of the cylindrical lanyard shaft 304 to activate the push-push mechanism. As shown, the cylindrical lanyard shaft 304 has a first end 308 and a second end 310, and defines an aperture 312 proximal the first end 308. It is understood that the cylindrical lanyard shaft 304 need not be circular in cross section, but may have an oval, rectangular, or another suitable cross section. In this manner, as explained below, a user may easily deploy the lanyard attachment post 300 for use and easily hide or stow the attachment post when not in use.

In deploying or hiding the lanyard attachment post 300, the push 303 of a finger or other object acts against force exerted by a helical compression spring (see FIG. 4) within the push-push mechanism. It is understood that another biasing element may be used in place of a helical compression spring without departing from the scope of this disclosure. To accommodate and retain the helical compression spring, the retractable lanyard attachment post 300 includes a spring retainer 342 that is coupled to the cylindrical housing 305. In an embodiment, the spring retainer 342 is a spring retaining plate 342. As discussed in connection with FIG. 4 below, the helical compression spring is disposed between the spring retainer 342 and the second end 310 of the lanyard shaft 304. In this way the helical compression spring is configured to exert a force tending to push the lanyard shaft 304 into the deployed position, and to provide resistance against a finger pushing 303 the lanyard shaft into the recessed position.

As discussed above, a finger push 303 on the first end 308 of the cylindrical lanyard shaft 304 can activate the push-push mechanism. A cam follower (see FIG. 5), that is, a pin or other shaped protrusion, is configured to couple with a contoured track 346 to activate the push-push mechanism. The cam follower in addition is coupled to the lanyard shaft 304. As discussed below in connection with FIG. 5, the contoured track 346 is configured to cooperate with the cam follower to latch the lanyard shaft 304 into one of a position of deployment and a recessed position. The cooperation may be effected through the action of a spring clip.

The retractable lanyard attachment post 300 may include a spring clip 348 configured to exert a force on the cam follower to maintain coupling of the cam follower with the contoured track 346. The spring clip 348 may also be configured to exert a force to hold the spring clip in place against the cylindrical housing 305. Thus, the lanyard shaft 304 moves with respect to the spring clip 348 when the lanyard shaft moves with respect to the cylindrical housing 305. In this manner, a finger push 303 on the first end 308 of the lanyard shaft 304 may activate the push-push mechanism to deploy or hide the retractable lanyard attachment post 300.

Figure 4:
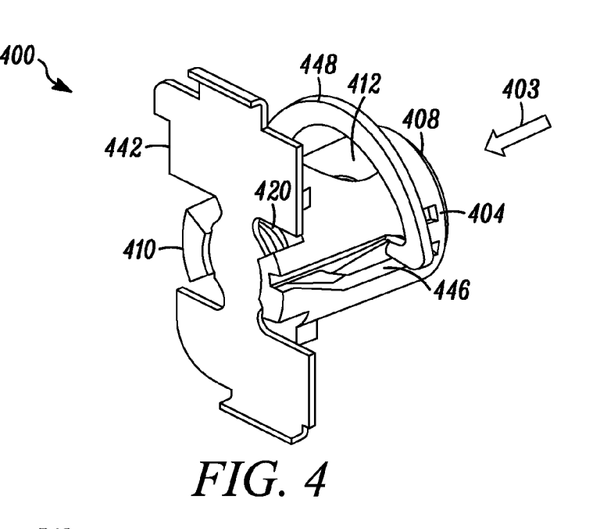
FIG. 4 shows a right rear three quarter view of the retractable lanyard attachment post shown in FIG. 3.

FIG. 4 shows a right rear three quarter view of the retractable lanyard attachment post 400 showing the helical compression spring 420 discussed above. The helical compression spring 420 is disposed between the spring retainer 442 and the second end 410 of the lanyard shaft 404. As mentioned above, the spring retainer 442 is coupled to the cylindrical housing 305. In this manner, the helical compression spring 420 is configured to exert a force between the cylindrical housing 305 and the lanyard shaft 404.

Figure 5:
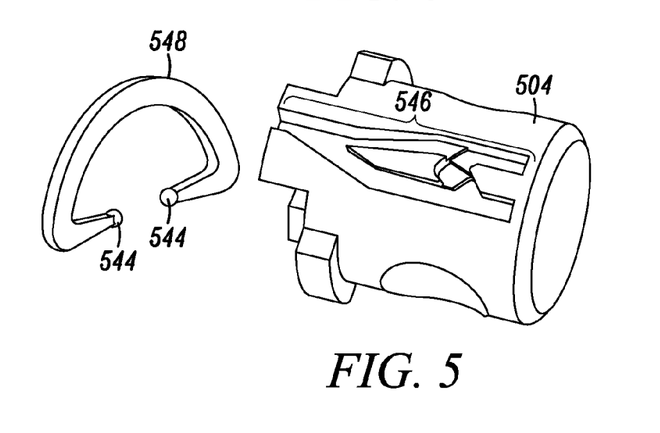
FIG. 5 shows separate views of the spring clip and the cylindrical shaft of the embodiment of FIG. 3 and FIG. 4.

FIG. 5 shows separate views of the spring clip that can exert a force on a cam follower, and the cylindrical shaft including the aperture to attach a lanyard, of the embodiment of FIG. 3 and FIG. 4. The spring clip 548 includes the cam follower 544, and in this embodiment is configured as a C-clip. As discussed, the cam follower is coupled to the lanyard shaft 304 (see FIG. 3). In an embodiment, the lanyard shaft 504 may be configured to define the contoured track 546.

The contoured track 546 can cooperate with the cam follower 544 to latch/unlatch the lanyard shaft 304 into one of a position of deployment and a recessed position. Contours in the contoured track 546 direct motion of the cam follower 544 with respect to the contoured track and to the lanyard shaft 304. For example, when the lanyard shaft 304 is in the recessed position, a push on the lanyard shaft directs the cam follower 544 to move to a portion of the contoured track that is configured to allow the lanyard shaft to be pushed by the helical spring 420 (see FIG. 4) into the deployed position. When the lanyard shaft 304 is in the deployed position, pushing on the lanyard shaft directs the cam follower 544 to move to a portion of the contoured track from which portion the cam follower may be directed to move, and latch into, the stowed position. In this way, the lanyard attachment post 300 may be retained in the recessed position and thus hidden within the device 102 (see FIG. 1), thereby preserving the design lines and styling of the device 102 when the attachment post 300 is not in use. Accordingly, a lanyard attachment post 300 that incorporates a push-push mechanism of the first type may enable a user to easily deploy the lanyard attachment post for use and to easily stow the attachment post when not in use.

Figures 6, 7, 8:
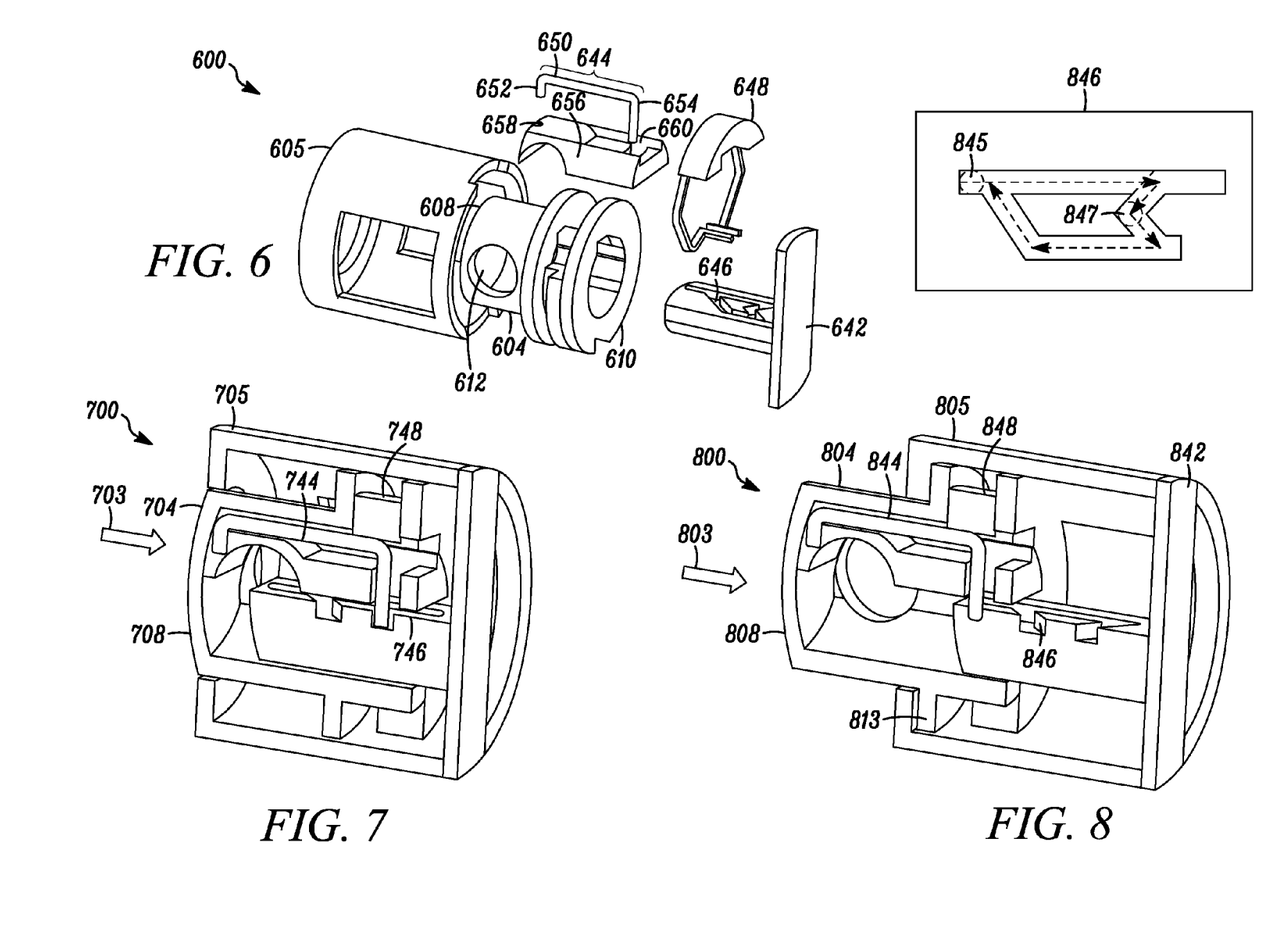
FIG. 6 shows an exploded view of an embodiment of a device that is a retractable lanyard attachment post that can operate according to a second type of push-push mechanism.
FIG. 7 shows the retractable lanyard attachment post of FIG. 6 in a recessed position.
FIG. 8 shows the retractable lanyard attachment post of FIG. 6 in a deployed position.

FIG. 6 shows an exploded view of an embodiment of a device 600 that is a retractable lanyard attachment post that can operate according to a second type of push-push mechanism, a different type than the push-push mechanism described with respect to FIGS. 3 to 5. The lanyard attachment post 600 includes a number of parts that cooperate to accomplish the operation of the second type of push-push mechanism. Although some parts of the attachment post 600 may be similar in configuration or function to parts of the first type of push-push mechanism discussed above, the parts of the lanyard attachment post 600, and their cooperation, are discussed below to clarify the differences in configuration and operation between the first type and the second type of push-push mechanism.

In the second type of push-push mechanism, the lanyard attachment post 600 includes a cylindrical housing 605, within which may slide a cylindrical lanyard shaft 604. It is understood that the cylindrical lanyard shaft 604 need not be circular in cross section, but may have an oval, rectangular, or another suitable cross section. The lanyard shaft 604 is hollow, and has a first end 608 and a second end 610. A user may alternately deploy and hide the retractable lanyard attachment post 600 by a finger push (see FIGS. 7 and 8) on the first end 608 of the cylindrical lanyard shaft 604 to activate the push-push mechanism. In this way, as discussed below, a user may easily deploy the lanyard attachment post 600 for use with a lanyard and easily hide the attachment post when not in use.

To accommodate a lanyard, the lanyard shaft 604 defines an aperture 612 that is proximal the first end 608. The aperture 612 is configured to receive a lanyard. The aperture 612 is exposed when the lanyard shaft 604 is in the deployed position, and is hidden with the lanyard shaft 604 when the shaft is in the recessed position.

In deploying or hiding the lanyard attachment post 600, a finger push (703, see FIG. 7 below) acts against force exerted by a helical compression spring (not shown) within the push-push mechanism. It is understood that another biasing element may be used in place of a helical compression spring. To accommodate and retain the helical compression spring, the lanyard attachment post 600 includes a spring retainer 642 coupled to the cylindrical housing 605. In an embodiment, the spring retainer 642 is a spring retaining plate 642. The helical compression spring is disposed between the spring retaining plate 642 and the second end 610 of the lanyard shaft 604. In this way, the helical compression spring is configured to exert force tending to push the lanyard shaft 604 into the deployed position, and to provide resisting force against a finger pushing (803, see FIG. 8) the lanyard shaft into the recessed position.

As discussed above, a finger push on the first end 608 of the cylindrical lanyard shaft 604 can activate the push-push mechanism. To effect this activation, the push-push mechanism includes a cam follower 644 and a contoured track 646. In the retractable lanyard attachment post 600 the cam follower 644 is coupled to the lanyard shaft 604. The cam follower is configured to couple with the contoured track 646, which is coupled to the spring retainer 642. As discussed below, the contoured track 646 can cooperate with the cam follower 644 to latch the lanyard shaft 604 into one of a position of deployment and a recessed position.

The cooperation between the cam follower 644 and the contoured track 646, and their coupling, may be maintained via a spring clip 648. The retractable lanyard attachment post 600 thus may include a spring clip 648 configured to exert a force on the cam follower 644. The spring clip 648 is configured to apply a force to maintain the coupling of the cam follower 644 with the contoured track 646. The spring clip 648 is coupled to the cylindrical lanyard shaft 604 so that the spring clip moves together with the lanyard shaft when the lanyard shaft moves with respect to the cylindrical housing 605. In this manner, a finger push on the first end 608 of the lanyard shaft 604 may activate the push-push mechanism to deploy or hide the retractable lanyard attachment post 600.

In the embodiment shown of the second type of push-push mechanism, the cam follower 644 is an elongated bar 650 having a perpendicular pivot segment 652 and a perpendicular engagement segment 654. The retractable lanyard attachment post 600 may further include a cam follower support element 656 disposed within the hollow lanyard shaft 604. The cam follower support element 656 is configured with a receptacle 658 to receive the pivot segment 652. The receptacle 658 is proximal the first end 608 of the lanyard shaft 604. The cam follower support element 656 is further configured with a slot 660 that is configured to receive the engagement segment 654, with the slot 660 proximal the second end 610 of the lanyard shaft 604.

As just discussed, the cam follower support element 656 defines a receptacle 658 and a slot 660 corresponding respectively to the pivot segment 652 and the engagement segment 654 of the cam follower 644. Accordingly, the cam follower support element 656 can support the cam follower 644 to maintain the pivot segment 652 of the cam follower 644 in the receptacle 658 and to movably maintain the engagement segment 654 of the cam follower 644 in the slot 660 for engagement with the contoured track 646. That is, the engagement segment 654 can move from side to side within the slot 660, as needed, during operation of the push-push mechanism. In this way the cam follower 644 can maintain engagement with the contoured track 646. FIG. 7 and FIG. 8 show how these elements may cooperate during operation of the lanyard attachment post 600.

FIG. 7 shows the retractable lanyard attachment post 700 in a recessed position. As explained above, the spring clip 748 maintains the cam follower 744, supported and guided by the cam follower support element 656 (see FIG. 6), in engagement with the contoured track 746. Accordingly, the cam follower 744, in engagement with the contoured track 746, can latch the lanyard shaft 704 into the recessed position within the cylindrical housing 705. In this manner, the lanyard attachment post 700 may be retained in the recessed position and thus hidden within the device 102 (see FIG. 1), thereby preserving the design lines and styling of the device 102 when the attachment post 700 is not in use.

FIG. 8 shows the retractable lanyard attachment post 800 in a deployed position. As mentioned in connection with FIG. 7, the spring clip 848 maintains the cam follower 844, supported and guided by the cam follower support element 656 (see FIG. 6), in engagement with the contoured track 846. In this manner, the lanyard shaft 804 may be maintained in the deployed position within the cylindrical housing 805 by the force exerted by the helical compression spring (not shown). During the motion of the lanyard shaft 804, for example from the deployed position to the recessed position, or vice versa, the engagement segment 654 can move transversely in the slot 660 of the cam follower support element 656, as needed, to negotiate the contours of the contoured track 846.

As mentioned, via the cam follower support element 656 couples the lanyard shaft 804 with the cam follower 844. The contoured track 846 can cooperate with the cam follower 844 to latch/unlatch the lanyard shaft 804 into one of a position of deployment and a recessed position. Contours in the contoured track 846 direct motion of the cam follower 844 with respect to the contoured track 846. For example, when the lanyard shaft 704 (see FIG. 7) is in the recessed position, a push on the lanyard shaft directs the cam follower 744 to move to a portion of the contoured track that is configured to allow the lanyard shaft to be pushed by the helical spring (not shown) into the deployed position, as discussed previously. When the lanyard shaft 804 is in the deployed position, pushing on the lanyard shaft directs the cam follower 844 to move to a portion of the contoured track 846 from which portion the cam follower may be directed to move, and latch into, the stowed position.

As shown in the inset to FIG. 8, the engagement end 654 (see FIG. 6) of the cam follower 844 may rest in an unlatched position 845 of the contoured track when the lanyard attachment post 800 is in the deployed position. The end of the contoured track 845 may prevent further outward motion of the attachment post 800. Moreover, a flange 813 around the lanyard shaft 804 may engage with the cylindrical housing 805 to limit outward travel.

A finger push 803 against the first end 808 of the lanyard shaft 804, and subsequent release, may act to bring the engagement end 654 to a latched position 847, following the dashed path shown in the inset. When the lanyard attachment post is in the latched position, with the engagement end 654 resting in the latched position 847, a finger push 703 (see FIG. 7) and subsequent release may act to bring the engagement end 654 to the unlatched position 845, following the dashed path shown in the inset. In this manner, a finger push on the first end 808 of the lanyard shaft 804 may activate the push-push mechanism to deploy or hide the retractable lanyard attachment post 800. Accordingly, a lanyard attachment post 600 (see FIG. 6) that incorporates a push-push mechanism of the second type may enable a user to easily deploy the lanyard attachment post 700 for use and to easily stow the attachment post 800 when not in use.

Figure 9:
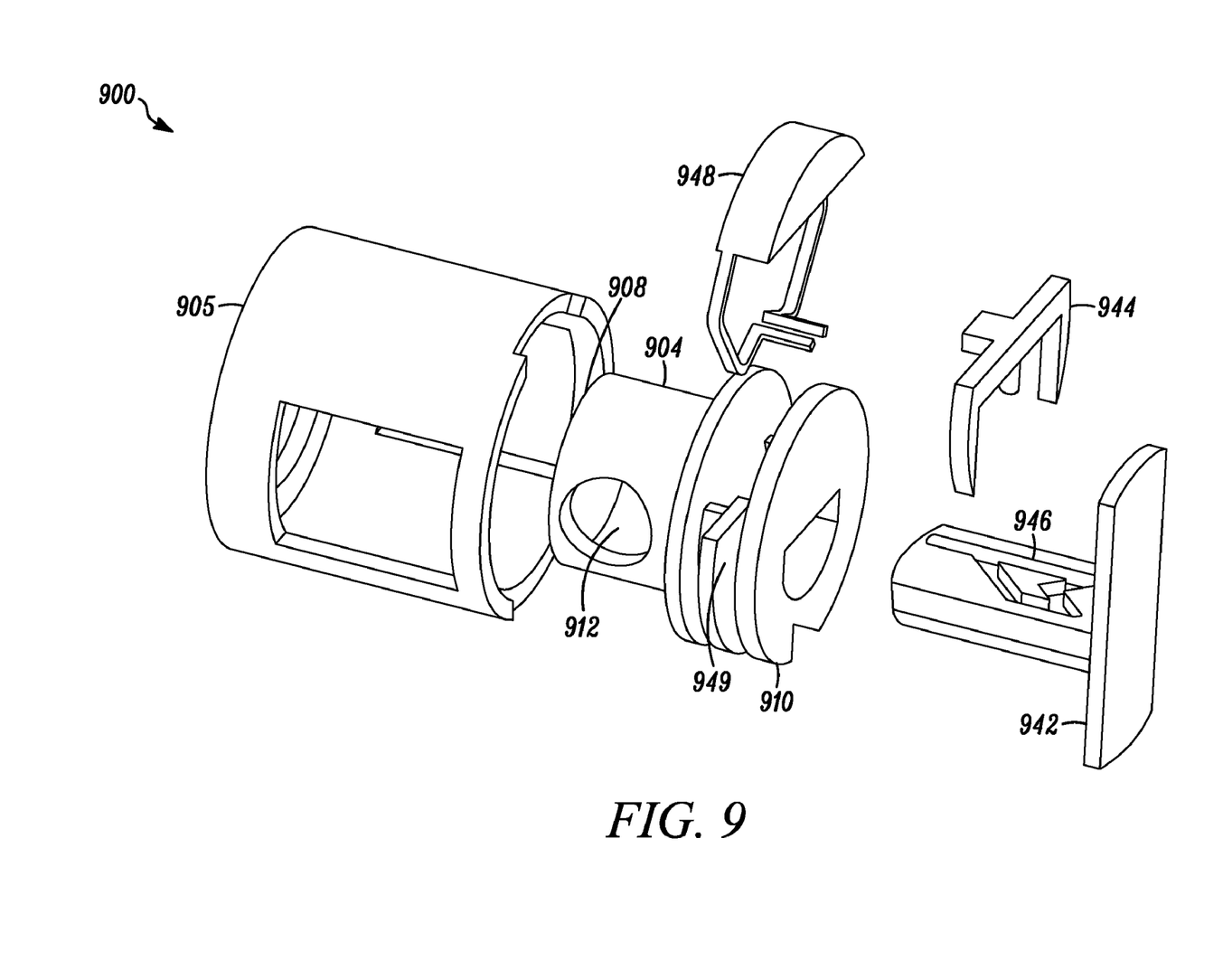
FIG. 9 shows an exploded view of an embodiment of a device that is a retractable lanyard attachment post that can operate according to a third type of push-push mechanism.

FIG. 9 shows an exploded view of an embodiment of a device 900 that is a retractable lanyard attachment post that can operate according to a third type of push-push mechanism, of a different type than either of the two push-push mechanisms previously described. The lanyard attachment post 900 includes a number of parts that cooperate to accomplish the operation of the third type of push-push mechanism. Although some parts of the attachment post 900 may be similar in configuration or function to parts of the first type or second type of push-push mechanisms discussed above, the parts of the lanyard attachment post 900, and their cooperation, are discussed below to clarify the differences in configuration and operation between the first type and second type of push-push mechanisms, and the third type of push-push mechanism.

In the third type of push-push mechanism, the lanyard attachment post 900 includes a cylindrical housing 905, and a cylindrical lanyard shaft 904 configured to slide within the cylindrical housing 905. It is understood that the cylindrical lanyard shaft 904 need not be circular in cross section, but may have an oval, rectangular, or another suitable cross section. The lanyard shaft 904 is hollow, and has a first end 908 and a second end 910. A user may alternately deploy and hide the retractable lanyard attachment post 900 by a finger push (see FIGS. 10 and 11) on the first end 908 of the cylindrical lanyard shaft 904 to activate the push-push mechanism. In this way, as discussed below, a user may easily deploy the lanyard attachment post 900 for use with a lanyard and easily hide the attachment post when not in use.

To accommodate a lanyard, the lanyard shaft 904 defines an aperture 912 that is proximal the first end 908. The aperture 912 is configured to receive a lanyard. The aperture 912 is exposed when the lanyard shaft 904 is in the deployed position, and is hidden with the lanyard shaft 904 when the shaft is in the recessed position.

In deploying or hiding the lanyard attachment post 900, a finger push (1003, see FIG. 10 below) acts against force exerted by a helical compression spring (not shown) within the push-push mechanism. It is understood that another biasing element may be used in place of a helical compression spring. To accommodate and retain the helical compression spring, the lanyard attachment post 900 includes a spring retainer 942 coupled to the cylindrical housing 905. In an embodiment, the spring retainer 942 is a spring retaining plate 942. The helical compression spring is disposed between the spring retaining plate 942 and the second end 910 of the lanyard shaft 904. In this way, the helical compression spring is configured to exert force tending to push the lanyard shaft 904 into the deployed position, and to provide resisting force against a finger pushing (1103, see FIG. 11) the lanyard shaft into the recessed position.

As discussed above, a finger push on the first end 908 of the cylindrical lanyard shaft 904 can activate the push-push mechanism. To effect this activation, the push-push mechanism includes a cam follower 944 and a contoured track 946. In the retractable lanyard attachment post 900, the cam follower 944 is coupled to the lanyard shaft 904. The cam follower 944 is configured to couple with the contoured track 946, which is coupled to the spring retainer 942. As discussed below, the contoured track 946 can cooperate with the cam follower 944 to latch the lanyard shaft into a recessed position or to unlatch the lanyard shaft for deployment.

The cooperation between the cam follower 944 and the contoured track 946, and their coupling, may be maintained via a spring clip 948. The retractable lanyard attachment post 900 thus may include a spring clip 948 configured to exert a force on the cam follower 944. The spring clip 948 is configured to apply a force to maintain the coupling of the cam follower 944 with the contoured track 946. The spring clip 948 is coupled to the cylindrical lanyard shaft 904 so that the spring clip moves together with the lanyard shaft when the lanyard shaft moves with respect to the cylindrical housing 905. In this manner, a finger push on the first end 908 of the lanyard shaft 904 may activate the push-push mechanism to deploy or hide the retractable lanyard attachment post 900.

In the embodiment shown of the third type of push-push mechanism, the cam follower 944 may be configured as an E-clip, with two outer legs that protrude downward in FIG. 9 and a middle, shorter leg that also protrudes downward and is configured to engage the contoured track 946. The lanyard shaft 904 may define a transverse slot 949 within which the E-clip 944 may slide during operation of the lanyard attachment post 900. The E-clip 944 and transverse slot 949 may be configured so that the E-clip is free to move side to side in the transverse slot, while negotiating the contours of the contoured track 946. It is understood that other configurations of the cam follower that are free to move side to side while negotiating the contours of the contoured track are within the scope of this discussion.

Figure 10:
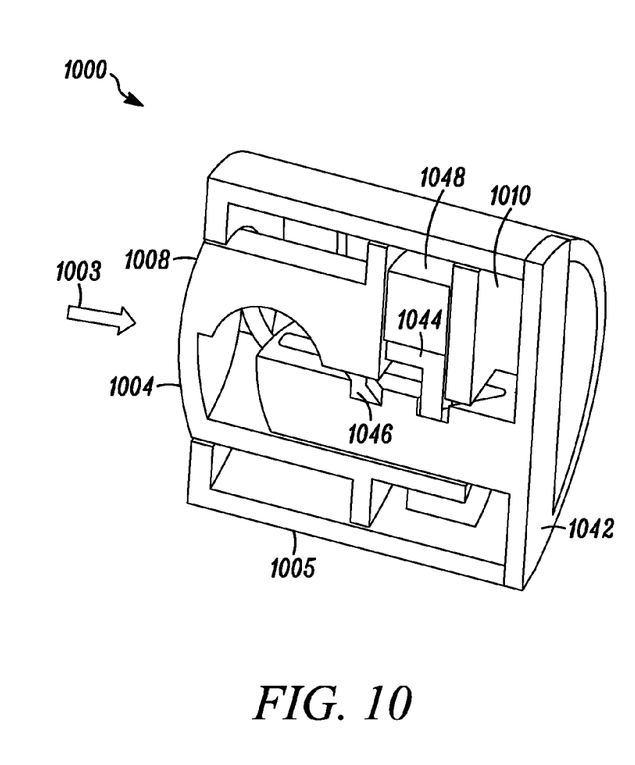
FIG. 10 shows the retractable lanyard attachment post of FIG. 9 in a recessed position.
Figure 11:
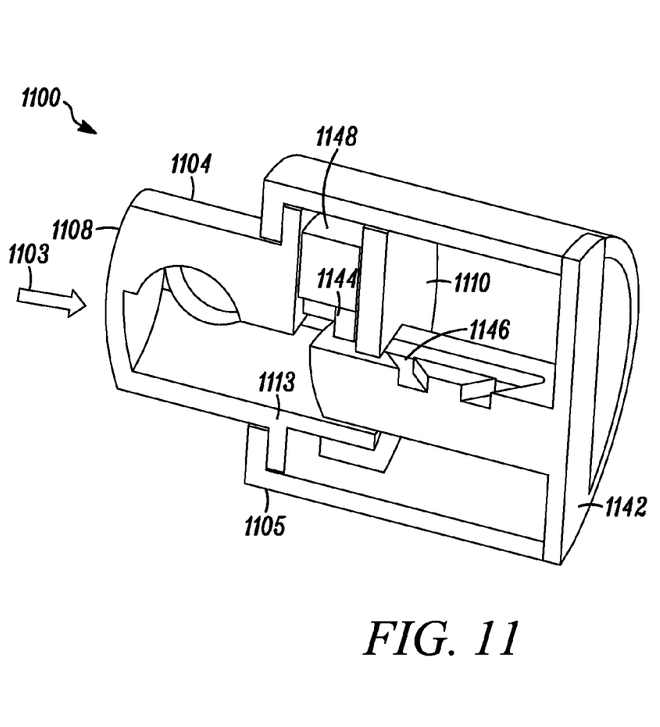
FIG. 11 shows the retractable lanyard attachment post of FIG. 9 in a deployed position.

The contoured track 946 can cooperate with the cam follower 944 to latch the lanyard shaft 904 into one of a position of deployment and a recessed position. The retractable lanyard attachment post 900 may include a spring clip 948 configured to exert a force on the cam follower 944. As discussed below, the spring clip 948 is configured to apply a force to maintain the coupling of the cam follower 944 with the contoured track 946. FIG. 10 and FIG. 11 show how these elements may cooperate during operation of the lanyard attachment post 900.

FIG. 10 shows the retractable lanyard attachment post 1000 in a recessed position. The spring clip 1048 maintains the cam follower 1044, that is, the E-clip, in engagement with the contoured track 1046, so as to latch the lanyard shaft 1004 into the recessed position within the cylindrical housing 1005. FIG. 11 shows the retractable lanyard attachment post 1100 in a deployed position. The spring clip 1148 maintains the E-clip 1144 in engagement with the contoured track 1146. The helical compression spring (not shown) has forced the lanyard shaft 1104 into the deployed position within the cylindrical housing 1105, with the end of the contoured track preventing any further outward motion of the lanyard shaft 1104 from the cylindrical housing 1105. As discussed above in connection with FIG. 8, a flange 1113 around the cylindrical shaft 1104 may engage the cylindrical housing 1105 to limit further outward motion. It is understood that other embodiments may include corresponding flanges to limit outward motion.

As mentioned, the cam follower 1144 is coupled to the lanyard shaft 11104. The contoured track 1146 can cooperate with the cam follower 1144 to latch/unlatch the lanyard shaft 1104 into one of a position of deployment and a recessed position. As discussed in connection with other embodiments above, for example, in connection with the inset of FIG. 8, contours in the contoured track 1146 can direct motion of the cam follower 1144 with respect to the contoured track 1146. For example, when the lanyard shaft 1104 is in the recessed position, a push on the lanyard shaft directs the cam follower 1144 to move to a portion of the contoured track that is configured to allow the lanyard shaft to be pushed by the helical spring (not shown) into the deployed position. When the lanyard shaft 1104 is in the deployed position, pushing on the lanyard shaft directs the cam follower 1144 to move to a portion of the contoured track 1146 from which portion the cam follower may be directed to move, and latch into, the stowed position. In this way, the lanyard attachment post 1100 may be retained in the recessed position and thus concealed within the device 102 (see FIG. 1), thereby preserving the design lines and styling of the device 102 when the attachment post 1100 is not in use.

Figure 12:
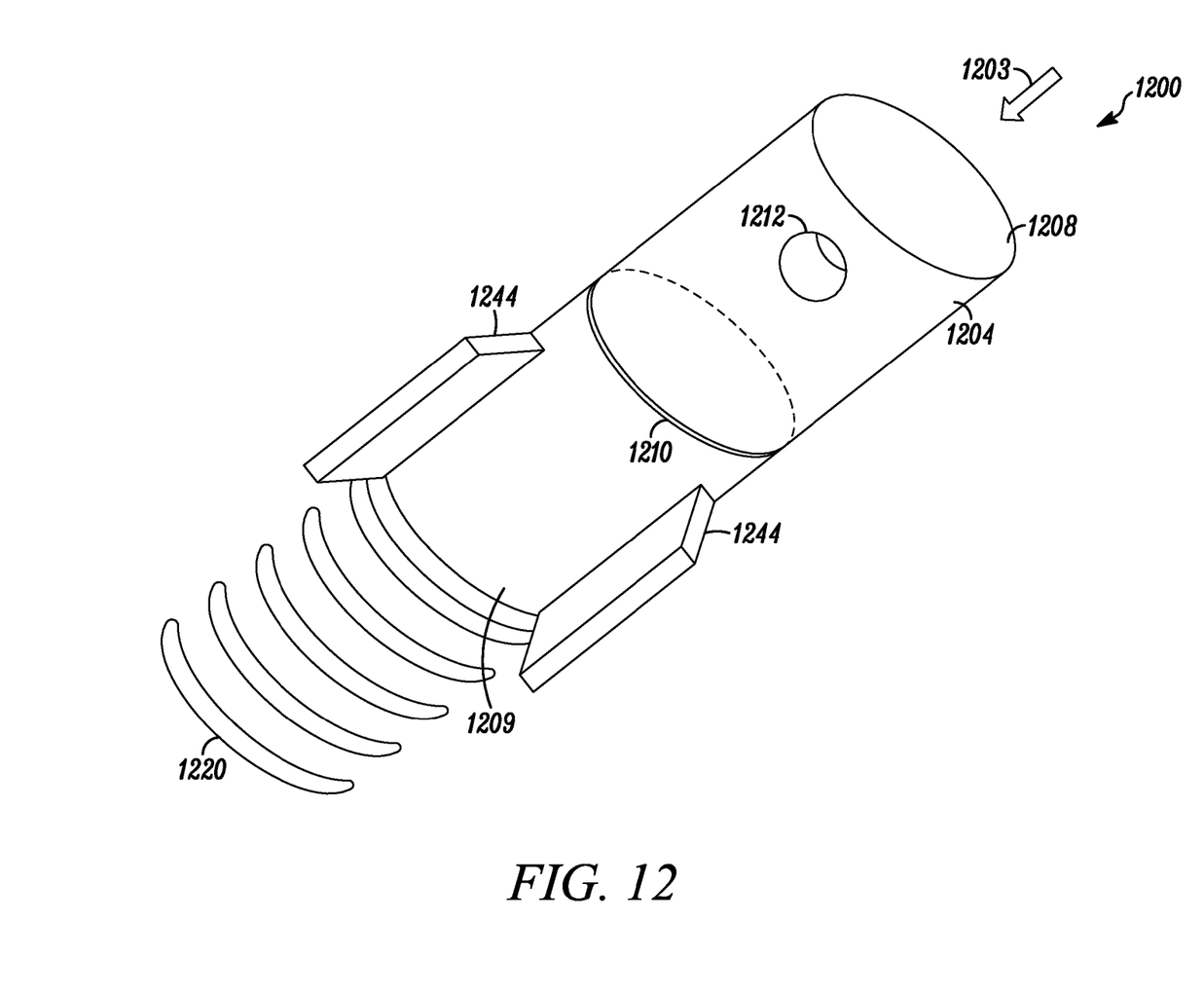
FIG. 12 shows an embodiment of a retractable lanyard attachment post that can operate according to a fourth type of push-push mechanism.

FIG. 12 shows an embodiment of a device 1200 that is a retractable lanyard attachment post that can operate according to a fourth type of push-push mechanism. The fourth type of push-push mechanism differs from the first, second, and third types previously described, as explained below. The lanyard attachment post 1200 includes a number of parts that cooperate to accomplish the operation of the fourth type of push-mechanism. Although some parts of the lanyard attachment post 1200 may resemble in configuration or function to parts of the first type, second type, or third type of push-push mechanisms discussed above, the parts of the lanyard attachment post 1200, and their cooperation, are discussed below to clarify the differences in configuration and operation between the first through third types of push-push mechanism, and the fourth type of push-push mechanism.

The lanyard attachment post 1200 may include a push-push mechanism in which the cam follower 1244 is configured as a series of lugs or vanes symmetrically disposed around a cylindrical surface 1209 coupled to the cylindrical lanyard shaft 1204. The cylindrical surface 1209 may be for example, rotatably coupled to the cylindrical lanyard shaft 1204 at the second end 1210 of the lanyard shaft. The contoured track (not shown) may be configured as two series of complementary lugs, vanes, or slots symmetrically disposed around an inner cylindrical surface of the cylindrical housing (not shown). That is, the contoured track is coupled to the cylindrical housing.

A helical spring 1220 is configured to exert a force to move the lanyard shaft 1204 into a deployed position. In this manner, the helical spring 1220 is configured to exert a force on the cam follower 1244 to maintain the cam follower in the contoured track. In the deployed position, the vanes of the cam follower 1244 engage one series of lugs of the contoured track that allow the lanyard shaft 1204 to attain the deployed position.

A push on the lanyard shaft 1204 while in the deployed position can move the lanyard shaft into the recessed position. As the lanyard shaft 1204 moves into the recessed position, the cam follower 1244 may cooperate with the contoured track to rotate the cylindrical surface coupled to the cylindrical lanyard shaft 1204. Upon release of the lanyard shaft 1204, the helical spring 1220 forces the lanyard shaft a short distance outward, with a further rotation of the cylindrical surface coupled to the cylindrical lanyard shaft. In the new orientation, the lugs of the cam follower 1244 engage the other series of lugs of the contoured track which are configured to prevent motion of the lanyard shaft 1204 into the deployed position.

To deploy the lanyard attachment post 1200, a user may push on the lanyard shaft 1203. A push on the lanyard shaft 1204 while it is in the recessed position can move the lanyard shaft a short distance into the cylindrical housing. As the lanyard shaft 1204 moves into the housing, the cam follower 1244 cooperates with the contoured track to rotate the cylindrical surface coupled to the cylindrical lanyard shaft 1204. In the new orientation, the lugs of the cam follower 1244 can engage the first series of lugs of the contoured track which are configured to allow motion of the lanyard shaft 1204 into the deployed position. In this way, the lanyard attachment post 1200 may be retained in the recessed position and thus hidden within the device 102 (see FIG. 1), thereby preserving the design lines and styling of the device 102 when the attachment post 1200 is not in use. Accordingly, a lanyard attachment post 1200 that incorporates a push-push mechanism of the fourth type may enable a user to easily deploy the lanyard attachment post for use and to easily stow the attachment post when not in use.

As previously mentioned, a lanyard attachment post may extend from an end or side of the mobile communication device. It is understood that in any of the embodiments of FIGS. 3 through 12, the attachment post may be disposed proximal a hinge 132 (see FIG. 1) of a portable electronic device 102. Moreover, an electronic device 102 may include a housing that has an end. It is understood to be within the scope of this disclosure that in any of the embodiments of FIGS. 3 through 12 the retractable lanyard attachment post may be disposed proximal the end of the electronic device 102.

Figure 13:
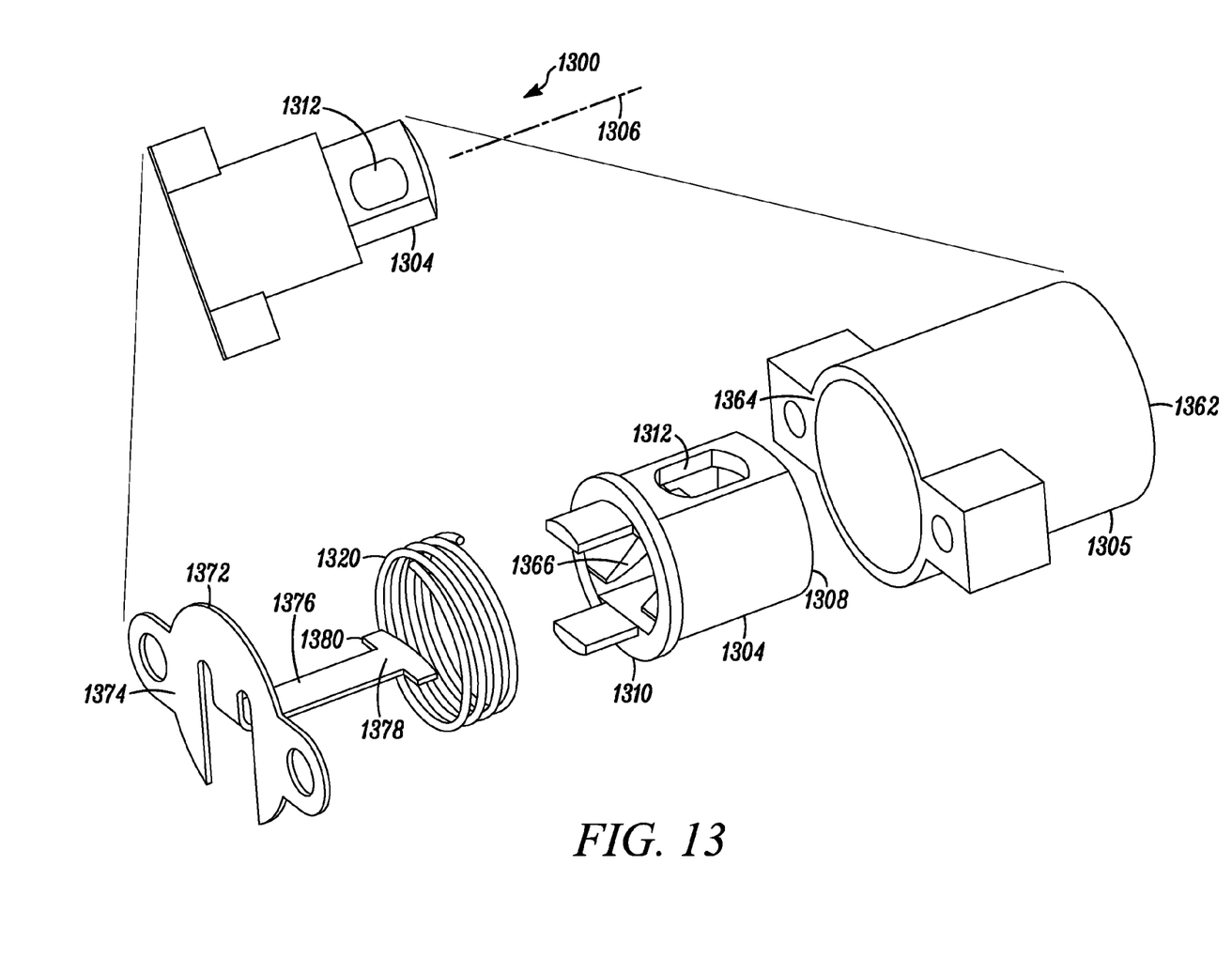
FIG. 13 shows an embodiment of a push-push compliant arm device that can operate according to a fifth type of push-push mechanism.

FIG. 13 shows an embodiment of a push-push compliant arm device 1300 that can operate according to a fifth type of push-push mechanism. The push-push mechanism of the compliant arm device 1300 differs from each of the four types of push-push mechanism discussed above. The push-push compliant arm device 1300 includes a number of parts that cooperate to accomplish the operation of the fifth type of push-push mechanism. The configuration and operation of the push-push compliant arm device 1300 is discussed below.

In the fifth type of push-push mechanism, the push-push compliant arm device 1300 includes a cylindrical post 1304 that has an axis 1306. As shown in the exploded view, the device 1300 includes a cylindrical housing 1305 having a first end 1362 and a second end 1364, with the cylindrical post 1304 configured to slide within the cylindrical housing 1305. It is understood that the cylindrical lanyard shaft 1304 need not be circular in cross section, but have an oval, rectangular, or another suitable cross section. The cylindrical post 1304 is hollow, and has a terminal end 1310 and an outside end 1308. A user may alternately engage and disengage the push-push compliant arm device 1300 by a finger push (see FIGS. 14 through 20) on the first end 1308 of the cylindrical post 1304 to activate the push-push mechanism. In this way, as discussed below, a user may easily engage the push-push compliant arm device for example to deploy it for use, and easily disengage the push-push compliant arm device 1300 for example to hide the device when not in use.

In an embodiment the cylindrical post 1304 may define an aperture 1312. In an embodiment with an aperture 1312, the push-push compliant arm device 1300 may be used for example in a portable electronic device 102 (see FIG. 1) as a retractable lanyard attachment post 1300 as discussed below. In a deployed position shown in the figure, the hollow cylindrical post is configured to be at least partially outside the cylindrical housing 1305. In this position the aperture may be exposed for use, for example, as a lanyard attachment point. In the following discussion, the cylindrical post 1304 may be referred to as a lanyard attachment post or lanyard shaft, nonetheless it is understood that the push-push compliant arm device may be used in other applications.

The hollow cylindrical post 1304 in addition has a release position substantially within the cylindrical housing 1305, and a stowed position in which the outside end 1308 of the hollow cylindrical post 1304 is substantially flush with the first end 1362 of the cylindrical housing 1305. In this way, a lanyard attachment post that incorporates the compliant arm device 1300 may be retained in the recessed position and thus concealed within the device 102 (see FIG. 1), thereby preserving the design lines and styling of the device 102 when the attachment post is not in use.

In deploying or hiding the lanyard attachment post 1300, a finger push (1403, see FIG. 14 below) acts against force exerted by a helical compression spring 1320 within the push-push mechanism. It is understood that another biasing element may be used in place of a helical compression spring. To accommodate and retain the helical compression spring 1320, the device 1300 includes a plate 1372 having a plane 1374 and coupled to the second end 1364 of the cylindrical housing 1305. In the device 1300 the helical spring 1320 is disposed between the plate 1372 and the hollow cylindrical post 1304. In this way, the helical compression spring 1320 is configured to exert a force between the cylindrical housing 1305 and the hollow cylindrical post 1304 tending to push the hollow cylindrical post 1304 into the deployed position, and to provide resisting force against a finger pushing the hollow cylindrical post into the recessed position.

As discussed above, a finger push on the first end 1308 of the lanyard attachment post 1304 can activate the push-push mechanism. To effect this activation, the push-push compliant arm device 1300 includes an interior deflection ramp 1366 and a compliant arm 1376. The interior deflection ramp 1366 is oriented along the axis 1306 of the hollow cylindrical post 1304 and coupled to the hollow cylindrical post 1304. The interior deflection ramp 1366 is configured to couple with the compliant arm 1376, which is coupled to the plate 1372. As discussed below, the compliant arm 1376 can cooperate with the interior deflection ramp 1366 to latch the lanyard attachment post 1304 into a recessed position or unlatch the lanyard attachment post for deployment.

The compliant arm 1376 may be substantially perpendicular to the plane 1374 of the plate 1372, when the lanyard attachment post is in the deployed position. The compliant arm 1376 has an end 1378 including a detent engagement member 1380. As discussed in detail below, the detent engagement member 1380 retains the hollow cylindrical post 1304 in the recessed or stowed position against the force of the helical spring 1320. In this manner the compliant arm 1376 can maintain engagement with the interior deflection ramp 1366. Moreover, the helical spring 1320 urges the hollow cylindrical post 1304 to the deployed position from the release position when the hollow cylindrical post 1304 is in the stowed position. In this manner the compliant arm 1376 can maintain engagement with the interior deflection ramp 1366. FIGS. 14 through 20 show how the elements of the push-push compliant arm device 1300 may cooperate during its operation.

Figures 14, 15, 16:
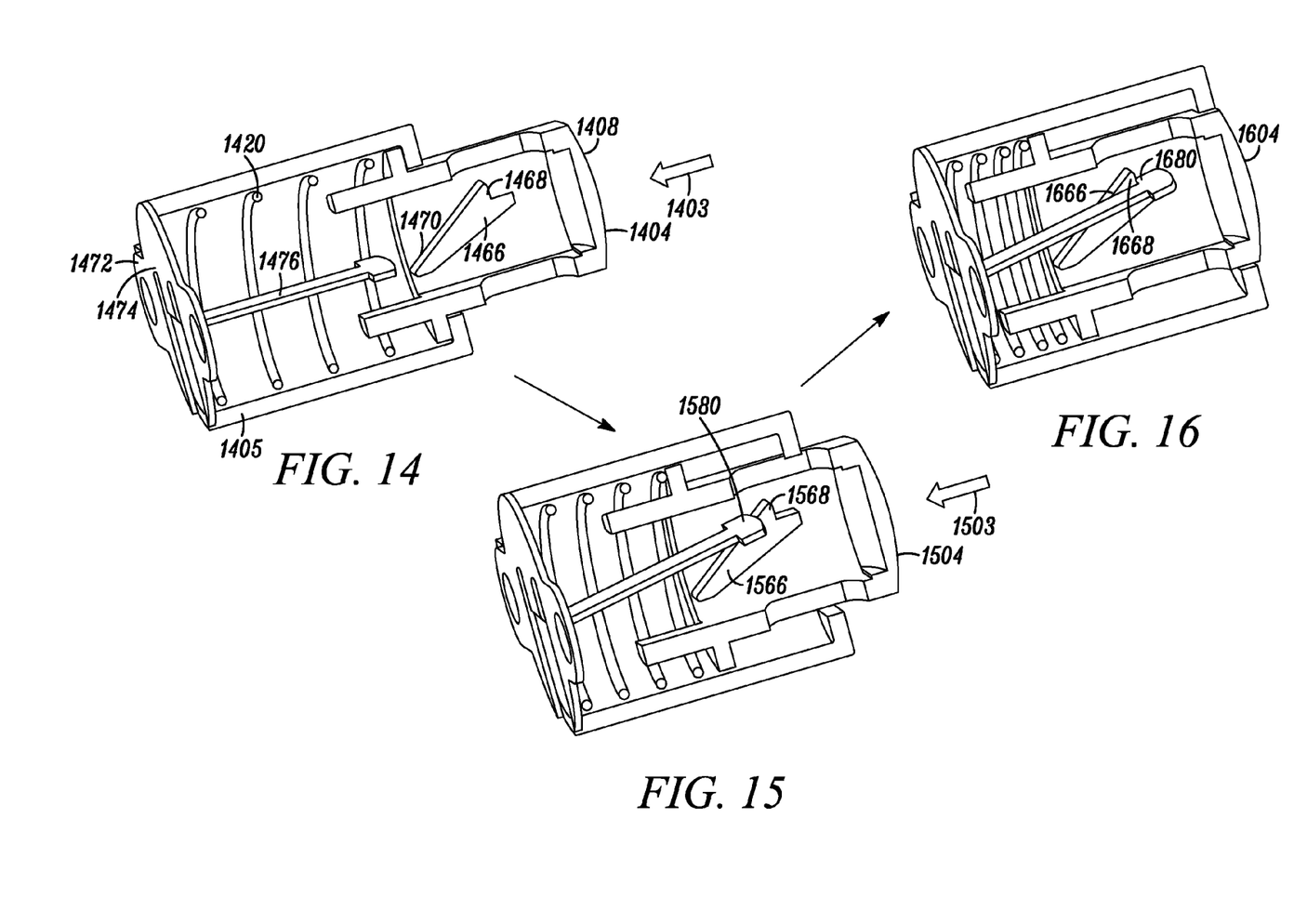
FIG. 14 shows in cutaway view the push-push compliant arm device of FIG. 13.
FIG. 15 shows the push-push compliant arm device of FIG. 13 in a position intermediate between the deployed position and the recessed position.
FIG. 16 shows the push-push compliant arm device of FIG. 13 pushed in to the recessed position.

FIG. 14 shows in cutaway view the push-push compliant arm device 1300 (see FIG. 13). The deflection ramp 1466 of the hollow cylindrical post 1404 has a detent engagement end 1468 proximal the outside end 1308 of the hollow cylindrical post 1404 and has a starting end 1470 proximal the terminal end 1310 of the hollow cylindrical post 1404. FIGS. 14, 15, and 16 show a sequence of positions of the push-push compliant arm device 1300 during motion of the hollow cylindrical post 1404 from the deployed position to the stowed position.

The detent engagement member 1380 (see FIG. 13) of the compliant arm 1476 is configured to engage the engagement end 1468 of the interior deflection ramp 1466 when the hollow cylindrical post 1404 is in the stowed position and to slide along the interior deflection ramp 1466 when the hollow cylindrical post 1404 moves from the deployed position to the stowed position.

FIG. 15 shows the push-push compliant arm device 1300 (see FIG. 13) in a position intermediate between the deployed position and the recessed position. As shown, as the lanyard shaft 1504 moves from the deployed position to the stowed position, the detent engagement member 1580 slides along the interior deflection ramp 1566 to approach the engagement end 1568 of the interior deflection ramp.

FIG. 16 shows the push-push compliant arm device 1300 (see FIG. 13) pushed in to the recessed position. The detent engagement member 1680 has reached the end of the interior deflection ramp 1666 and engaged the engagement end 1668 of the interior deflection ramp, thereby latching the lanyard shaft 1604 into the recessed position.

Figure 17:
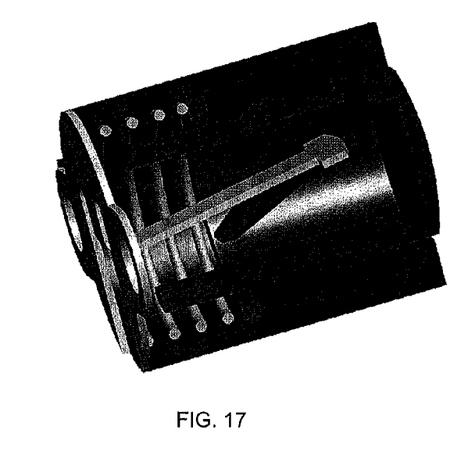
FIG. 17 shows the push-push compliant arm device of FIG. 13 in the recessed position.

FIGS. 17 to 20 show a sequence of positions of the push-push compliant arm device 1300 (see FIG. 13) during motion of the hollow cylindrical post 1404 from the stowed position to the deployed position. In FIG. 17, the push-push compliant arm device 1300 is shown in the latched configuration, as was shown previously in FIG. 16.

Figure 18:
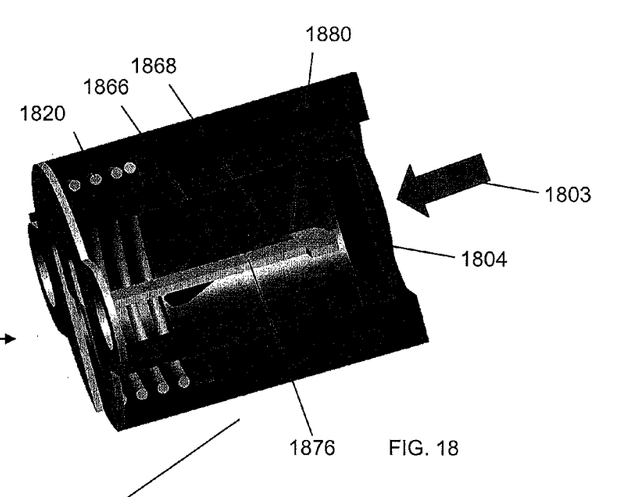
FIG. 18 shows the detent engagement member of the compliant arm disengaged from the engagement end of the interior deflection ramp.
Figure 19:
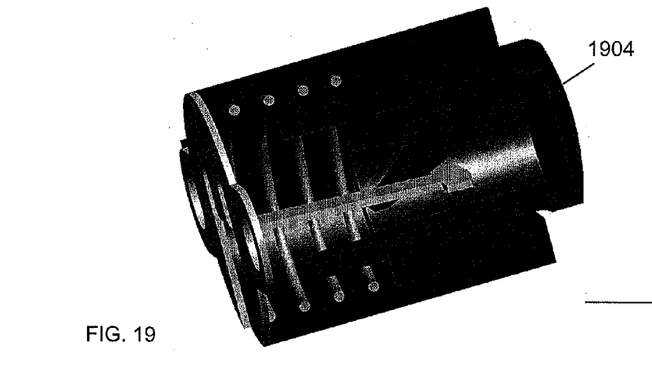
FIG. 19 shows the compliant arm can return to its initial position while the lanyard shaft moves outward.
Figure 20:
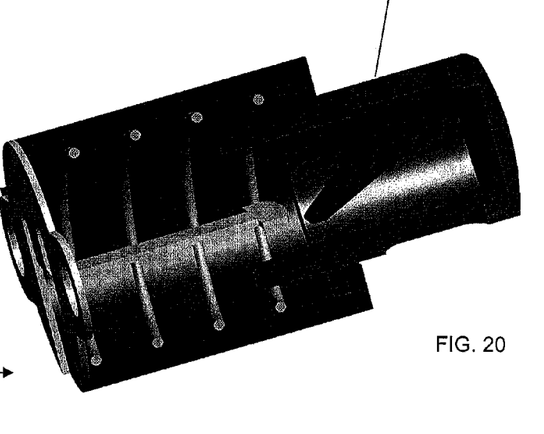
FIG. 20 shows the lanyard shaft of the compliant arm device returned to the deployed position.

FIG. 18 shows the detent engagement member of the compliant arm disengaged from the engagement end of the interior deflection ramp As shown in FIG. 18, a push on the lanyard shaft 1804 disengages the detent engagement member 1880 of the compliant arm 1876 from the engagement end 1868 of the interior deflection ramp 1866. Upon its disengagement, the lanyard shaft 1804 can move under the force exerted by the helical compression sprint 1820 to begin motion from the recessed position to the deployed position. As shown in FIG. 19, the compliant arm 1876 (see FIG. 18) can return to its initial position while the lanyard shaft 1904 moves outward. FIG. 20 shows the lanyard shaft 2004 of the compliant arm device returned to the deployed position.

It is understood that the push-push compliant arm device 1300 (see FIG. 13) may be incorporated in a variety of devices, for example in a portable electronic device 102 (see FIG. 1). In an embodiment, the portable electronic device 102 may include a hinge 132. The hinge 132 of the portable electronic device 102 may include a hinge knuckle 136 that defines a recess 105 within which the push compliant arm device 1300 may operate to deploy and/or conceal a retractable lanyard attachment post. In this manner, a mechanism for concealment and deployment of a lanyard attachment post 100 may better utilize the device 102 volume.

The push-push compliant arm device 1300 (see FIG. 13) may be incorporated in for example, a card reader. In the card reader, insertion of a card may engage the compliant arm device 1300 to latch the card into the reader. A subsequent push on the card may serve to unlatch the card. The push-push compliant arm device 1300 (see FIG. 13) may further be incorporated in for example, an electric switch. A push on for example, a push button of the electric switch may engage the compliant arm device 1300 to latch the switch into an ON position. A subsequent push on the push button may serve to unlatch the switch back to an OFF position. It is further understood that the push-push compliant arm device 1300 may be incorporated in a mechanical device, for example as a cabinet latch. In this manner the volume of a card reader, portable electronic device, electric switch, and cabinet latch may be better utilized. In addition a user may easily operate the push-push compliant arm device for example, to deploy a lanyard attachment post for use and easily stow the attachment post when not in use.

Described are mobile communication devices with retractable lanyard attachment posts that can be hidden when not in use. The disclosed embodiments of hidden lanyard attachment posts may include push-push or other mechanisms that a user may engage to deploy or hide the attachment post. A user may thereby be able to hide the lanyard attachment member, so that the sleek lines of modern mobile communication devices may be maintained. Several embodiments include a push-push mechanism, for example, an E-clip embodiment, a C-clip embodiment, a stacked internal mechanism embodiment, and a compliant arm mechanism embodiment. Also disclosed is an embodiment of a retractable lanyard attachment post that may be respectively retained or released by turning the attachment post. In this manner, with either a push-push embodiment or a turnable embodiment, the mechanism for concealment and deployment of the lanyard attachment post may better utilize the device volume.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A retractable lanyard attachment post for a portable electronic device, the attachment post comprising:
   a cylindrical shaft configured to be slidably received by a recess of the portable electronic device, the cylindrical shaft defining an axis and having a first end and a second end, and configured to have a first orientation and a second orientation about the axis of the cylindrical shaft, the cylindrical shaft further defining:
      an aperture proximal the first end, the aperture configured to receive a lanyard;
      a transverse slot perpendicular to the axis, and traversing a surface of the first end, the slot configured to enable rotating the cylindrical shaft about the axis from the first orientation to the second orientation; and
      a retention member proximal the second end; and
   a spring coupled to the cylindrical shaft proximal the second end, and configured to be compressed by the cylindrical shaft;
   wherein:
      the retention member is configured in the first orientation to engage a retention structure in the recess of the portable electronic device so as to keep the cylindrical shaft in a recessed position within the portable electronic device; and
      the cylindrical shaft is configured in the second orientation to be pushed by the spring partially out of the portable electronic device so that the aperture is available for receiving a lanyard.

2. The attachment post of claim 1, wherein:
   the cylindrical shaft is configured to be pushed into a recessed position within the portable electronic device; and
   the transverse slot is further configured so that, when the cylindrical shaft is pushed into the recessed position, the transverse slot enables rotation of the cylindrical shaft from the second orientation to the first orientation so that the retention member engages the retention structure.

3. The attachment post of claim 1, wherein the retention member comprises:
   at least one pin disposed perpendicular to a cylindrical surface of the cylindrical shaft and proximal the second end of the cylindrical shaft.

4. The attachment post of claim 3, wherein the retention structure comprises:
   at least one slot configured to correspond to the at least one pin of the retention member, the at least one slot including at least one perpendicular portion to prevent the retention member from being removed;
   wherein the retention structure is configured so that a compression force exerted by the spring maintains a clamping force between the at least one pin and the at least one perpendicular portion.

5. The attachment post of claim 1 wherein the portable electronic device includes a hinge having a hinge axis, and wherein the axis of the cylindrical shaft is aligned proximal the hinge axis.

6. The attachment post of claim 1, wherein the portable electronic device includes a hinge having a hinge knuckle, and wherein the hinge knuckle defines the recess.

7. The attachment post of claim 1, wherein the portable electronic device includes a housing having an end, and wherein the housing defines the recess proximal the end.

8. A device, comprising:
a cylindrical housing;
a cylindrical lanyard shaft configured to slide within the cylindrical housing, the lanyard shaft being hollow, the lanyard shaft having a first end and a second end, the lanyard shaft defining an aperture proximal the first end;
a spring retainer coupled to the cylindrical housing, the spring retainer including a spring retaining plate;
a helical compression spring disposed between the spring retention plate and the second end of the lanyard shaft;
a cam follower coupled to the lanyard shaft, the cam follower including an elongated bar having a perpendicular pivot segment and an perpendicular engagement segment;
a contoured track configured to cooperate with the cam follower and configured to latch the lanyard shaft into one of a position of deployment and a recessed position;
a spring clip configured to exert a force on the cam follower to maintain the cam follower in the contoured track; and
a cam follower support element disposed within the hollow lanyard shaft and configured with a receptacle to receive the pivot segment, the receptacle proximal the first end of the lanyard shaft, and with a slot to receive the engagement segment, the slot proximal the second end of the lanyard shaft, the cam follower support element further configured to support the cam follower to maintain the pivot segment in the receptacle and to movably maintain the engagement segment in the slot for engagement with the contoured track.

9. The device of claim 8, wherein the spring clip comprises the cam follower.

10. The device of claim 9, wherein the spring clip is configured as a C-clip.

11. The device of claim 8, wherein the cam follower is configured as an E-clip.

12. The device of claim 8, wherein the device is disposed proximal a hinge of a portable electronic device.

13. The device of claim 8, wherein:
the contoured track is coupled to the cylindrical housing; and
the helical spring is configured to exert a force on the cam follower to maintain the cam follower in the contoured track.

14. A push-push compliant arm device, comprising:
a cylindrical housing having a first end and a second end;
a hollow cylindrical post having an axis and configured to slide within the cylindrical housing, the hollow cylindrical post having a terminal end and an outside end, the hollow cylindrical post configured to have an deployed position at least partially outside the cylindrical housing, a release position substantially within the cylindrical housing and a stowed position in which the outside end is substantially flush with the first end of the cylindrical housing;
an interior deflection ramp oriented along the axis of the hollow cylindrical post and coupled to the hollow cylindrical post, the deflection ramp having a detent engagement end proximal the outside end of the hollow cylindrical post and having a starting end proximal the terminal end of the hollow cylindrical post;
a plate having a plane and coupled to the first end of the cylindrical housing;
a helical spring disposed between the plate and the hollow cylindrical post, and configured to exert a force between the cylindrical housing and the hollow cylindrical post;
a compliant arm coupled to the plate and perpendicular to the plane of the plate, the compliant arm having an end including a detent engagement member that is configured to engage the engagement end of the interior deflection ramp when the hollow cylindrical post is in the stowed position and to slide along the interior deflection ramp when the hollow cylindrical post moves from the deployed position to the stowed position;
wherein:
the detent engagement member retains the hollow cylindrical post in the stowed position against the force of the helical spring; and
the helical spring urges the hollow cylindrical post to the deployed position from the release position when the hollow cylindrical post is in the stowed position.

15. The push-push compliant arm device of claim 14, wherein the hollow cylindrical post further defines an aperture configured to receive a lanyard.

16. The push-push compliant arm device of claim 14, wherein the cylindrical housing is positioned within a hinge knuckle.

17. A card reader incorporating the push-push compliant arm device of claim 14.

18. A cabinet latch incorporating the push-push compliant arm device of claim 14.

19. An electric switch incorporating the push-push compliant arm device of claim 14.

20. A portable electronic device incorporating the push-push compliant arm device of claim 14.

* * * * *